US010171924B2

United States Patent
Mickelsen et al.

(10) Patent No.: US 10,171,924 B2
(45) Date of Patent: Jan. 1, 2019

(54) SYSTEMS AND METHODS FOR AUDIO CALIBRATION USING ACOUSTIC MEASUREMENTS

(71) Applicant: DISH Technologies L.L.C., Englewood, CO (US)

(72) Inventors: Jeremy Mickelsen, Denver, CO (US); Christopher Burns, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 2 days.

(21) Appl. No.: 15/616,504

(22) Filed: Jun. 7, 2017

(65) Prior Publication Data
US 2017/0366909 A1 Dec. 21, 2017

Related U.S. Application Data

(60) Provisional application No. 62/350,588, filed on Jun. 15, 2016.

(51) Int. Cl.
*H03G 3/20* (2006.01)
*H04R 29/00* (2006.01)
(Continued)

(52) U.S. Cl.
CPC .......... *H04R 29/004* (2013.01); *G06F 3/167* (2013.01); *H04R 3/00* (2013.01); *H04R 3/04* (2013.01);
(Continued)

(58) Field of Classification Search
CPC .......... H04R 29/004; H04R 3/00; H04R 3/04; H04R 3/06; H04R 2499/11; G06F 3/167; H04N 2005/4432
(Continued)

(56) References Cited

U.S. PATENT DOCUMENTS 9,210,508 B1 * 12/2015 Cloud ...................... H04R 3/10
2009/0320076 A1 * 12/2009 Chang ...................... G10L 15/22
725/60

(Continued)

FOREIGN PATENT DOCUMENTS

EP 2 271 134 A1 1/2011

OTHER PUBLICATIONS

International Search Report and Written Opinion for PCT/US2017/036683 dated Aug. 11, 2017, all pages.

*Primary Examiner* — Vivian Chin
*Assistant Examiner* — Ammar Hamid
(74) *Attorney, Agent, or Firm* — Kilpatrick Townsend & Stockton, LLP

(57) ABSTRACT

Various arrangements for providing audio calibration are presented. A remote control may determine that it is in position for an audio-based command to be received by the remote control from a user. Via a condenser microphone incorporated as part of the remote control, a calibration sound may be output. The condenser microphone may receive the output the calibration sound in the form of a reflected sound that is an acoustic reflection of the calibration sound. The remote control may analyze an amount of time that has elapsed between outputting the calibration sound and receiving the reflected sound to determine a distance between the condenser microphone and the user. One or more audio input settings may be configured that are used for modifying audio received by the condenser microphone based on the determined distance.

16 Claims, 8 Drawing Sheets

(51) Int. Cl.
*G06F 3/16* (2006.01)
*H04R 3/04* (2006.01)
*H04R 3/06* (2006.01)
*H04R 3/00* (2006.01)
*H04N 5/44* (2011.01)

(52) U.S. Cl.
CPC ....... *H04R 3/06* (2013.01); *H04N 2005/4432* (2013.01); *H04R 2499/11* (2013.01)

(58) Field of Classification Search
USPC .................................................. 381/57, 110
See application file for complete search history.

(56) References Cited

U.S. PATENT DOCUMENTS

| | | | |
|---|---|---|---|
| 2011/0003614 A1* | 1/2011 | Langereis | G01S 15/06 455/550.1 |
| 2015/0100322 A1* | 4/2015 | Lee | H04N 5/4403 704/275 |

* cited by examiner

SYSTEMS AND METHODS FOR AUDIO CALIBRATION USING ACOUSTIC MEASUREMENTS

CROSS-REFERENCE TO RELATED APPLICATION

This application claims priority to U.S. Provisional Patent Application 62/350,588, filed on Jun. 15, 2016, entitled "SYSTEMS AND METHODS FOR AUDIO CALIBRATION USING ACOUSTIC MEASUREMENTS," the entire disclosure of which is hereby incorporated by reference.

BACKGROUND

From smartphones to vehicle electronic systems, auditory commands are now frequently being used to control devices. Such commands can be more convenient and efficient for a user to speak rather than providing some alternative form of input, such as pressing a button or series of buttons, or providing input on a touchscreen. While auditory commands can be more convenient for a user to provide, convenience quickly shifts to frustration if the computerized system receiving the command does not properly interpret the command. The ability of a computerized system to accurately interpret a command may be partially due to auditory input varying significantly among users. For instance, while a user may tend to lean in towards a microphone while providing an auditory command, another user may tend to remain in a neutral position while providing such a command.

SUMMARY

Various embodiments are described related to audio calibration. In some embodiments, a method for audio calibration is described. The method may include determining, by a remote control, that the remote control is in position for an audio-based command to be received by the remote control from a user. The method may include outputting, via a microphone incorporated as part of the remote control, a calibration sound. The method may include receiving, via the microphone incorporated as part of the remote control that output the calibration sound, a reflected sound that is an acoustic reflection of the calibration sound. The method may include analyzing an amount of time that has elapsed between outputting the calibration sound and receiving the reflected sound to determine a distance between the microphone and the user. The method may include configuring one or more audio input settings that are used for modifying audio received by the microphone based on the determined distance.

Embodiments of such a method may include one or more of the following features: The method may include receiving, by the remote control, audio from the user via the microphone. The method may include analyzing, by a processor of the remote control, the audio in accordance with the configured one or more audio input settings to determine a command. The method may include transmitting, via a wireless transmitter of the remote control, the command to a television receiver. The method may include receiving, by the remote control, audio from the user via the microphone. The method may include transmitting, via a wireless transmitter of the remote control, a recording of the audio to a television receiver. The method may include analyzing, by a processor of the television receiver, the audio in accordance with the configured one or more audio input settings to determine a command. Configuring the one or more audio input settings may include configuring gain. Configuring the one or more audio input settings may include configuring equalization. The equalization may be configured to attenuate a frequency having a half wavelength equal to the determined distance. Determining that the remote control may be in position for the audio-based command to be received by the remote control from the user is based on a button of the remote control being pressed. The method may include updating a log that stores data based on a plurality of distance measurements made by analyzing amounts of time that have elapsed between outputting calibration sounds and receiving reflected sounds. Configuring the one or more audio input settings that are used for modifying audio received by the microphone may be further based on analysis of the log. The microphone may be selected from the group consisting of: a condenser microphone and a dynamic microphone.

In some embodiments, a remote control that performs audio calibration is described. The remote control may include a wireless transmitter. The remote control may include a condenser microphone. The remote control may include a processor. The processor may determine that the remote control is in position for an audio-based command to be received by the remote control from a user. The processor may output, via the condenser microphone incorporated as part of the remote control, a calibration sound. The processor may receive, via the condenser microphone, a reflected sound that is an acoustic reflection of the calibration sound. The processor may analyze an amount of time that has elapsed between outputting the calibration sound and receiving the reflected sound to determine a distance between the condenser microphone and the user. The processor may configure one or more audio input settings that are used for modifying audio received by the condenser microphone based on the determined distance.

Embodiments of such a remote control may include one or more of the following features: The processor may receive audio from the user via the condenser microphone. The processor may analyze the audio in accordance with the configured one or more audio input settings to determine a command. The processor may transmit, via the wireless transmitter of the remote control, the command to a television receiver. The command may request a channel change at the television receiver. The processor may be further configured to receive audio from the user via the condenser microphone. The processor may transmit, via the wireless transmitter of the remote control, a recording of the audio to a television receiver. The processor may analyze the audio in accordance with the configured one or more audio input settings to determine a command. The processor may configure the one or more audio input settings comprising the processor configuring gain. The processor may configure the one or more audio input settings comprising the processor configuring equalization. The equalization may be configured to attenuate a frequency having a half wavelength equal to the determined distance. The processor may determine that the remote control is in position for the audio-based command to be received by the remote control from the user based on a button of the remote control being pressed. The processor may determine that the remote control is in position for the audio-based command to be received by the remote control from the user based on an orientation determined by the orientation sensor. The processor may be further configured to: update a log that stores data based on a plurality of distance measurements made by analyzing amounts of time that have elapsed between outputting calibration sounds and receiving reflected sounds. The processor may configure the one or more audio input settings that are used for modifying audio received by the condenser microphone further based on the processor analyzing the log.

In some embodiments, a non-transitory processor-readable medium that includes processor-readable instructions is presented. The processor-readable instructions may cause the one or more processors to determine that a remote control is in position for an audio-based command to be received by the remote control from a user. The processor-readable instructions may cause the one or more processors to output, via a microphone incorporated as part of the remote control, a calibration sound. The processor-readable instructions may cause the one or more processors to receive, via the microphone, a reflected sound that is an acoustic reflection of the calibration sound. The processor-readable instructions may cause the one or more processors to analyze an amount of time that has elapsed between outputting the calibration sound and receiving the reflected sound to determine a distance between the microphone and the user. The processor-readable instructions may cause the one or more processors to configure one or more audio input settings that are used for modifying audio received by the microphone based on the determined distance.

BRIEF DESCRIPTION OF THE DRAWINGS

A further understanding of the nature and advantages of various embodiments may be realized by reference to the following figures.

DETAILED DESCRIPTION

Figure 1:
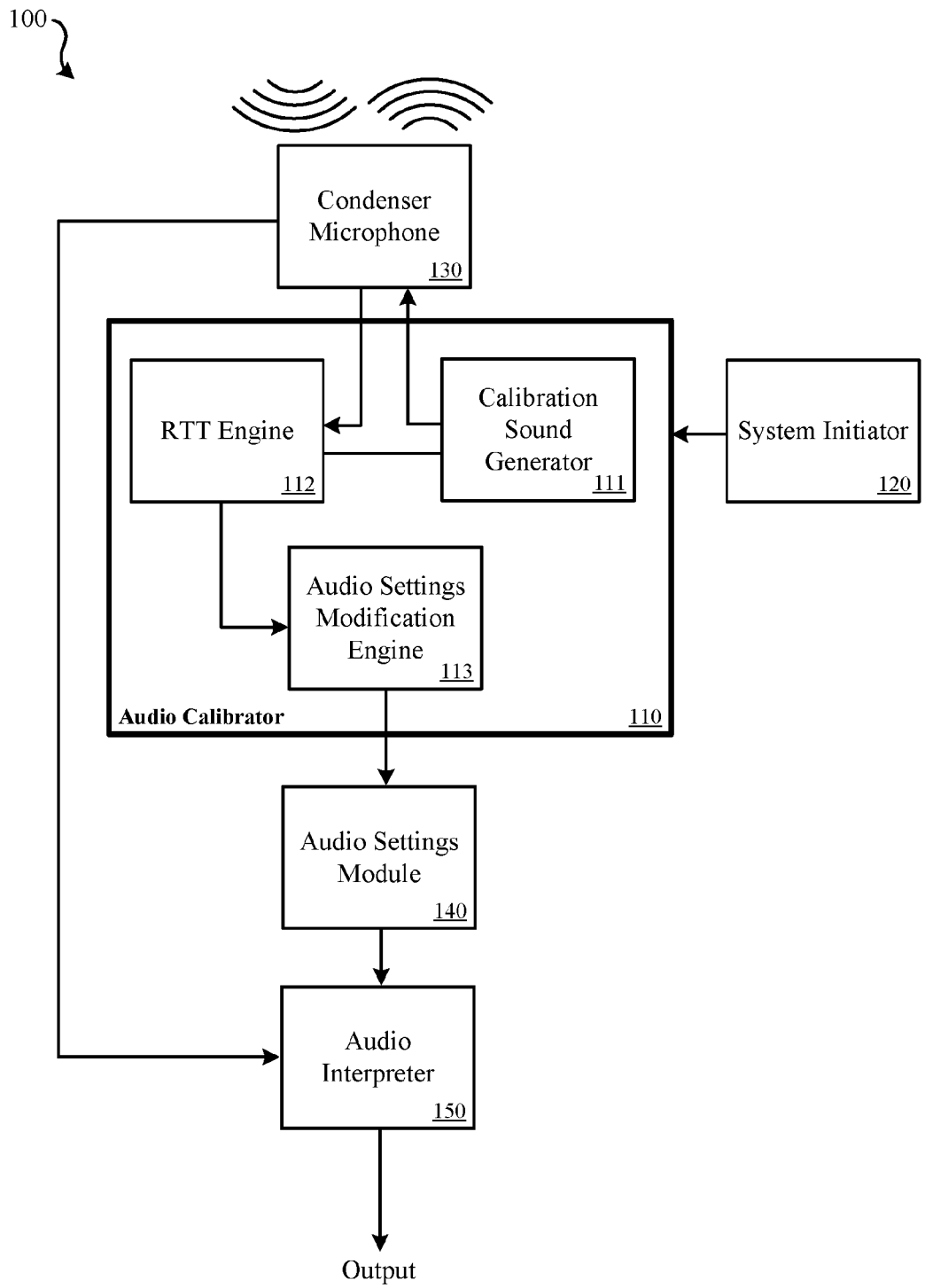
FIG. 1 illustrates an embodiment of a block diagram of a system that performs audio calibration using acoustic measurements.

In order to accurately recognize speech from a user, a voice-command system may modify characteristics of received audio in an attempt to put the received audio in a form appropriate for speech analysis. Distance between a user's mouth and a microphone into which the user is speaking may be a key factor in determining how audio captured by the microphone should be calibrated prior to analysis. For instance, some users tend to hold a microphone mere inches from their mouths, while others tend to hold the microphone greater than a foot away. While users tend to speak at different volumes, the distance between the user's mouth and the microphone can be used to approximate what gain should be used for normalizing the received audio. Further, the equalization of the received audio may be determined based on the distance between the user's mouth and the microphone. Attenuation of frequencies that approximately have a half wavelength equal to the distance between the user's mouth and the microphone may be useful due to these frequencies exhibiting constructive interference. Amplification of frequencies that approximately have a quarter wavelength equal to the distance between the user's mouth and the microphone may be useful due to these frequencies having destructive interference.

A situation during which multiple users may use a same microphone is with a television remote control. Typically, when a user uses a remote control to control a television receiver, the user is not specifically identifying himself to the television receiver. Rather, the user is simply using the remote control to set the television receiver to a desired television program and audio volume. A remote control may have an incorporated microphone that allows the user to speak a command. For instance, common commands may include: "go to channel 827;" "go to CBS;" "raise the volume;" "open the EPG;" and "channel up." Such spoken commands may be more efficient than for the user to push a button or series of buttons on the remote control to effectuate the same command. Since the system that includes the remote control and the television receiver may be unaware of characteristics of the user issuing the command to the remote control, information gathered about the distance between the remote control's microphone and the user's face may be useful in determining how to set or adjust various audio settings.

In such embodiments of a remote control, the microphone present may be a condenser microphone. In other embodiments, various types of dynamic microphones may be used. A ribbon microphone may be used in some embodiments. In a condenser microphone, a diaphragm acts as a plate of a capacitor. Vibrations induced on the diaphragm by environmental sound causes the distance between the plates of the microphone to change. While, typically, condenser microphones are used to convert sensed audio into electrical signals, the reverse situation can also be realized. By applying an electrical signal to the condenser microphone's electrical circuit, the diaphragm of the condenser microphone can be caused to vibrate, thus emitting a sound into the environment of the microphone. By using the microphone to emit the sound, a precise distance between the microphone and a reflective surface (e.g., a user's face) can be determined based on the sound's round trip time without requiring a dedicated component for measuring distance.

By having the condenser microphone emit a sound, a round trip time between when the sound is emitted by the microphone and a reflection of the sound is received by the microphone can be measured. This round trip time may be used by a processor of the remote control (or television receiver or cloud-based server) to calculate a distance between the remote control and a nearest object, which, if the user is about to issue a spoken command, is likely the user's face. Based on the calculated distance, one or more audio settings may be determined or modified. The one or more audio settings can include gain and equalization (EQ).

In some embodiments, when a user is about to issue a voice command, the user may push a button on the remote control (or actuate some other user input device on the remote control, such as flip a switch, touch or perform a gesture using a touchpad or touch sensor, and/or hold the remote control in a particular orientation). When a user pushes such a button, the user typically will hold the remote control in the location and in the manner in which the user will speak the command. Further, in this position, the microphone of the remote control can be expected to be pointed approximately directly at the user's mouth, or more generally, the user's face. In response to the user pushing the button, the distance may be measured between the microphone and the user's face prior to the user speaking the auditory command. The microphone may be caused to emit a sound based on an electrical signal, such as a sinc pulse, being transmitted to the microphone via the microphone's electrical circuit. Shortly thereafter (such as around 0.00177 seconds later if the user's face is about a foot away from the microphone), the microphone may receive a reflection of the emitted sound. Based on the time difference between when the sound was emitted and when the reflection was received, the distance between the microphone and the user's face or mouth can be determined. One or more stored tables and/or equations can be used by the remote control (or television receiver or cloud-based server) to determine how one or more audio settings should be set in order to normalize and/or modify received sound to increase the likelihood that the user's to-be-spoken command is properly interpreted. The command to be interpreted using the determined one or more audio settings may be received shortly after the distance has been determined.

Further detail regarding the above embodiments are provided in relation to the figures. FIG. 1 illustrates an embodiment of a block diagram of a system 100 that performs audio calibration using acoustic measurements. System 100 can include: audio calibrator 110, system initiator 120, condenser microphone 130, audio settings module 140, and audio interpreter 150. It should be understood that system 100 is presented in the form of a block diagram. Various illustrated components may be performed by the same physical hardware (e.g., a processor); various components may also be subdivided and performed across multiple pieces of hardware.

System initiator 120 may represent hardware that triggers audio calibration. Typical human habits may result in system initiator 120 being activated after condenser microphone 130 has been moved into the position at which the user will speak into the microphone. System initiator 120 may be button that is depressed just before a user begins speaking. System initiator 120 may include: a button, a switch, some other form of physical actuator, accelerometer, touch sensor, touchpad, or even an audio sensor (e.g., which, in combination with condenser microphone 130, may be listening for a particular initialization phrase). When system initiator 120 determines that a command spoken by a user is about to be received, a signal indicating as such may be passed to audio calibrator 110.

Audio calibrator 110 may include multiple components including: calibration sound generator 111, round trip time (RTT) engine 112, and audio settings modification engine 113. Calibration sound generator 111 may generate an electrical signal on a circuit that is coupled with condenser microphone 130. This electrical signal may be in the form of a "sinc pulse" such as described by equation 1:

$$Sync(t) = \lim_{x \to t} \frac{\sin(ax)}{ax} \quad \text{Eq. 1}$$

Alternative signals may be output by calibration sound generator 111 to condenser microphone 130. The signal(s) may be limited in duration by truncation, or windowing via multiplication with an envelope of the desired duration. Calibration sound generator 111 may output an indication that the signal has been output to condenser microphone 130 to RTT engine 112. Alternatively, RTT engine 112 may sense the sinc pulse or other signal transmitted by calibration sound generator 111 on the electrical circuit coupled with condenser microphone 130. The sinc pulse or other signal may be transformed from an electrical signal into an acoustic sound by condenser microphone 130. The sound generated by condenser microphone 130 may be generally directed at a perpendicular direction to a plane of the condenser microphone's diaphragm.

A short time thereafter, condenser microphone 130 may receive a reflection of the emitted sound. Condenser microphone 130 may convert the reflected emitted sound into an electrical signal, which is passed to RTT engine 112. RTT engine 112 may be configured to: (1) identify the electrical signal as the reflection of the emitted sound (e.g., the reflected sound may substantially be a sinc pulse if the emitted sound was a sinc pulse); and (2) determine a round trip time between when the calibration sound was generated and when the reflected sound was received. Using this round trip time, a distance may be determined. For example, equation 2 may be used to determine a distance between the condenser microphone 130 that emitted the sound and the object that reflected the sound.

$$\frac{\left(1126 \frac{\text{ft}}{\text{sec}}\right) \cdot (RTT)}{2} = d \quad \text{Eq. 2}$$

In equation 2, the value of 1,126 feet per second represents the speed of sound in dry air at sea level. This static value may be used rather than varying the speed of sound based on measured conditions (humidity, altitude). RTT represents the round trip time from when the sound was emitted by condenser microphone 130 and the reflected sound was received by condenser microphone 130. The distance between the condenser microphone and the object is represented by d.

The determined distance may be output to audio settings modification engine 113. Based on the determined distance as received from RTT engine 112, audio settings modification engine 113 may modify or set one or more audio settings that will be used to calibrate received audio. Gain may be a first audio setting that is set or modified. Equalization may be another audio setting that is modified. Equalization may be adjusted such that the frequency (and, possibly, frequencies within a range above and below the frequency) which have a quarter wavelength that corresponds to the distance as received from RTT engine 112 may be augmented or attenuated due to interference being possible due to reflection between the user's face and condenser microphone with the precise variables depending on microphone orientation and enclosure. Similarly, frequencies that are multiples of quarter wavelengths may be augmented or attenuated by audio settings modification engine 113 adjusting the EQ. For a quarter wavelength distance between the user's mouth or face and the microphone, reflected sound will be 180 degrees out of phase with the source, which will cause the auditory signal to be lower for most configurations. For a half wavelength distance between the user's mouth or face and the microphone, reflected sound will be boosted with an alternating pattern for odd and even multiples of the quarter wavelength.

For equalization adjustments, the EQ would generally be somewhat "softer" than would be used for the constructive and destructive interference that two flat parallel surfaces could cause. By making the EQ "soft", steep gain transitions may be avoided that could also be helpful if the distance between the user's mouth and the microphone changes somewhat between measuring the distance and the user's subsequent utterance.

The modifications are settings determined by audio settings modification engine 113 and may be passed to audio settings module 140. Audio settings module 140 may be used to store the set or modified audio settings for later application to one or more voice commands received via condenser microphone 130. Audio, such as a spoken word command, received by condenser microphone 130 may be passed to audio interpreter 150. Prior to analyzing the content of the received audio, audio settings retrieved from audio settings module 140 may be used to calibrate or modify the received audio. For instance, the gain and equalization of the received audio from condenser microphone 130 may be adjusted by audio interpreter 150 prior to the received audio being processed to identify any present voice commands from the user.

The audio settings set or modified by audio settings modification engine 113 may be discarded when a user releases a button being used as system initiator 120. That is, the audio settings configured by audio calibrator 110 may only remain valid while a user is depressing or otherwise actuating system initiator 120. If a valid distance measurement is not obtained by audio calibrator 110, audio settings module 140 may default to using default equalization and gain settings or may use the previously set equalization gain settings. In some embodiments, equalization and gain settings may remain valid for a defined period of time. For example, for an hour following a valid distance measurement being performed by RTT engine 112, the resulting audio settings may be stored and used by audio settings module 140 and used by audio interpreter 150 for calibrating received audio from condenser microphone 130. In still other embodiments, a rolling window of distance measurements made by RTT engine 112 may be used for determining gain and/or equalization settings that are to be set at audio settings module 140. For instance, all distance measurements made within the previous hour by RTT engine 112 may remain valid. The distance used by audio settings modification engine 113 for setting the audio settings may be based on a mean or median distance of such valid distance measurements. Alternatively, instead of averaging or finding a median of the distance measurements, the gain and/or equalization settings may be averaged or combined in some other way by audio settings module 140.

Following interpretation of the received audio from condenser microphone 130, audio interpreter 150 may output an indication of an identified command or instruction that was interpreted based on audio settings retrieved from audio settings module 140. As an example, the output of audio interpreter 150 may be passed to a command execution component of a device or system in which system 100 is incorporated.

While FIG. 1 of system 100 illustrates a single microphone being present, it should be understood that such a system may include multiple microphones. For instance, each microphone may be pointed in a direction in which it is expected that a user may provide a voice command. Each of the microphones may be condenser microphones that are capable of generating a calibration sound. Alternatively, only one or a subset of the microphones may be condenser microphones that are capable of outputting a calibration sound.

Figure 2:
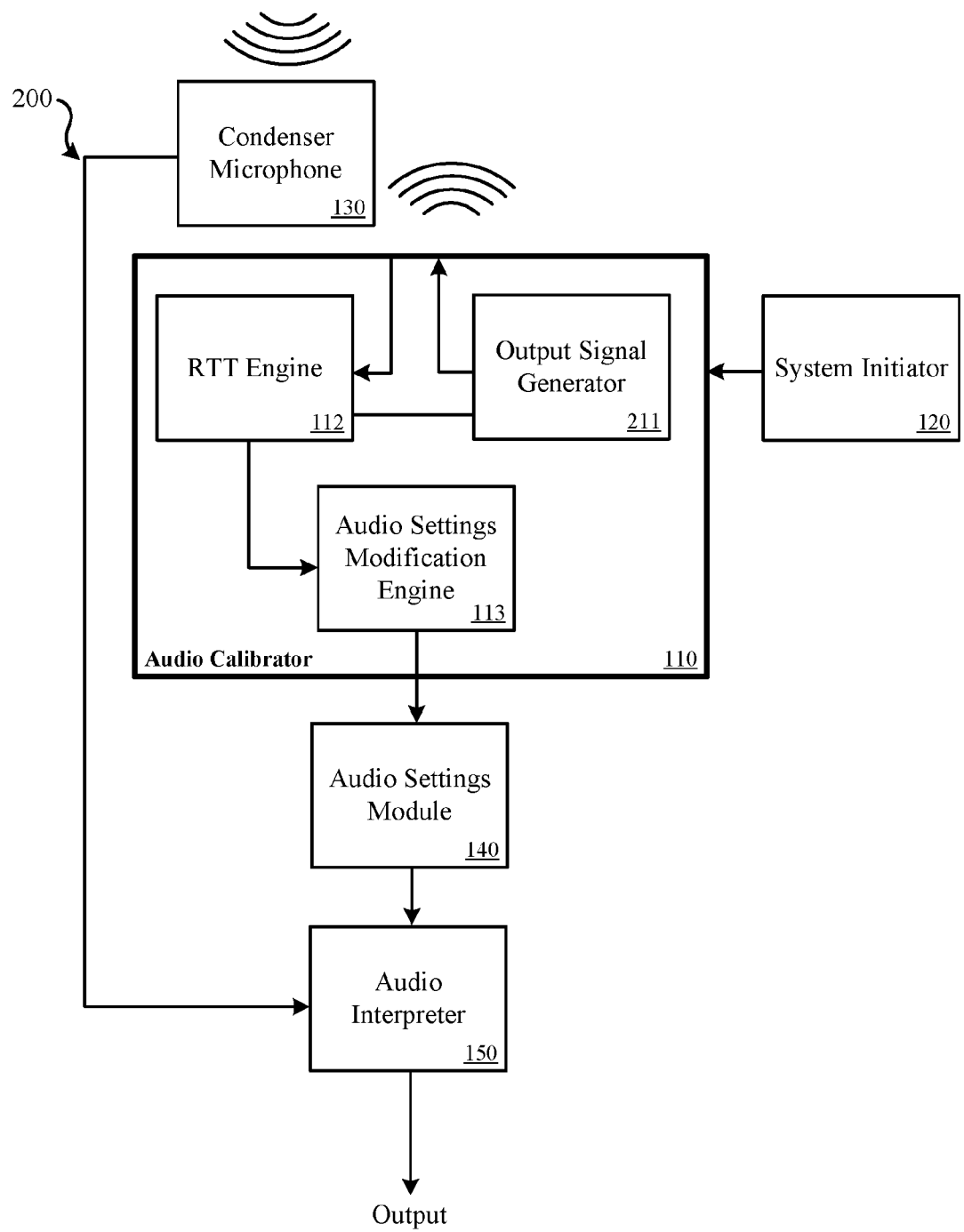
FIG. 2 illustrates an embodiment of a block diagram of a system that performs audio calibration using distance measurements.

In some embodiments, rather than the distance measurement being made based on a sound emitted by condenser microphone 130, another device may be employed. FIG. 2 illustrates an embodiment of a block diagram of a system 200 that performs audio calibration using distance measurements. System 200 may function substantially similarly to system 100 except that rather than a sound being generated using condenser microphone 130, a separate output signal generator 211 may be used. It should be understood that in system 200 a type of microphone other than a condenser microphone may be used since the microphone is not being used to output a sound. Output signal generator 211 may be a buzzer or speaker that is configured to output a sound that is then received by condenser microphone 130. RTT engine 112 may function as described in relation the system 100: the round-trip time between when the sound is output by output signal generator 211 and when the sound is received by condenser microphone 130 may be determined and then used to adjust audio settings by audio settings modification engine 113.

In other embodiments, output signal generator 211 may output a signal in a form other than sound. For example, output signal generator 211 may emit laser light that is pointed in a direction in which the users expected to be positioned in relation to system 200 when the user is about to speak a command into condenser microphone 130. The reflected light may then be received by an optical sensor of audio calibrator 110. The round-trip time of the light may be determined by RTT engine 112 and used for determining a distance that is then used by audio settings modification engine 113.

Figure 3:
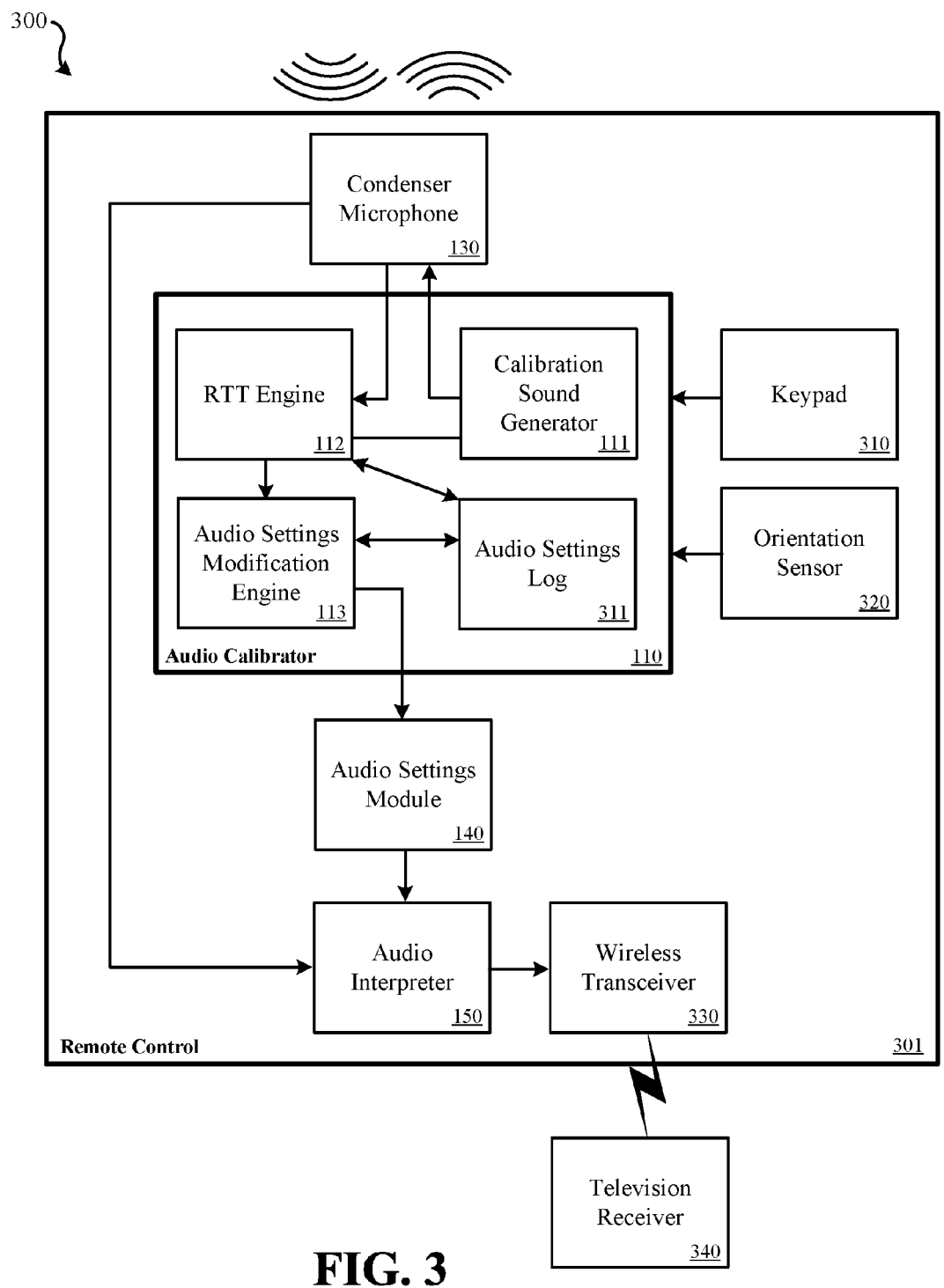
FIG. 3 illustrates an embodiment of a block diagram of a system that performs audio calibration using acoustic measurements as part of a remote control unit for controlling a television receiver.

Embodiments of system 100 and system 200 may be particularly useful when incorporated as part of a television receiver remote control through which a user is expected to issue voice commands for controlling functionality of the television receiver. As another example, systems 100 and 200 may be useful in a remote control unit that is used to control the functionality of a home automation system through which the users expected to issue voice commands. FIG. 3 illustrates an embodiment of a block diagram of a system that performs audio calibration using acoustic measurements as part of a remote control unit for controlling a television receiver.

As the system initiator 120, system 300 may use one or more keys of keypad 310 and/or orientation sensor 320. While giving a voice command, a user may be required to hold down a key of keypad 310 present on the remote control. When a user initially pushes such a key, audio calibrator 110 may be configured to set or modify the audio setting stored in audio settings module 140. In addition or alternately to use of keypad 310 to initialize use of audio calibrator 110, orientation sensor 320 may be used. Orientation sensor 320 may include one or more accelerometers and/or gyroscopes that are used to determine an orientation of remote control 301 in relation to gravity. Based on the determined orientation made by orientation sensor 320, audio calibrator 110 may be initialized. For example, when the user holds remote control 301 vertically, it may be unlikely that the user is attempting to push a key to provide a command to the television receiver but rather is holding remote control 301 as he would a large microphone. In some embodiments, when a user holds remote control 301 in one or more predetermined orientations, orientation sensor 320 may initialize audio calibrator 110. In some embodiments, measurements made by orientation sensor 320 are used in combination with the user pressing one or more keys of keypad 310 to initialize audio calibrator 110.

In system 300, audio calibrator 110 may additionally include audio settings log 311. Audio settings log 311 may be used to store: historic distance measurements made by RTT engine 112, and/or settings or modifications to settings output by audio settings modification engine 113. In some embodiments, audio settings log 311 may be incorporated as part of audio settings module 140. Audio settings log 311 maintain a historic rolling window of previously used distance and/or audio settings. In some embodiments, such historic settings are used in controlling the audio settings implemented by audio settings module 140. For instance, distance measurements and/or audio settings output by RTT engine 112 and audio settings modification engine 113, respectively, may be averaged with one or more historic settings from audio settings log 311.

In some embodiments, audio settings log 311 stores distance and/or audio settings in relation with orientation measurements made by orientation sensor 320. Particular users may tend to hold remote control 301 in one or more particular orientations when issuing a voice command. As such, by relating distance and/or audio settings with particular orientations of remote control 301, it may be possible to create various stored profiles of gain and EQ settings that are intended to be associated with individual users based on the orientation of remote control 301 being held. Therefore, for example, if audio calibrator 110 fails to or otherwise does not perform a distance measurement, audio settings log 311 may be accessed to determine an expected distance and/or audio settings that have previously been determined when the remote control has been sensed to be in the current orientation.

In system 300, audio interpreter 150 may output indication of a particular command to wireless transceiver 330. Wireless transceiver 330 may then transmit an indication of this command to television receiver 340. For example, audio interpreter 150 may output a digital indication of a command that says: "Channel 27." Audio interpreter 150 may then pass a command to wireless transceiver 330 that changes the channel of television receiver 340 to channel 27. Audio interpreter 150 may have access to a stored database of commands that is accessed to identify a command that corresponds to the interpreted voice command received from condenser microphone 130. In some embodiments, rather than a transceiver a wireless transmitter (that cannot necessarily receive data) may be present instead.

Television receiver 340 may be a dedicated television receiver device, which is typically referred to as a set top box (STB). Alternatively, television receiver 340 may be incorporated as part of another device. For example, television receiver 340 may be integrated as part of a television. In some embodiments, television receiver 340 may represent an expansion card or component that is installed into a television or other form of presentation device. In some embodiments, rather than communication being with television receiver 340, communication output from wireless transceiver 330 may be to a home automation system that is used to control one or more home automation systems located in a structure at which remote control 301 is being used. Typical home automation devices can include: lights, thermostats, appliances, home security systems, cameras, unmanned aerial vehicles (UAV), smoke and carbon monoxide detectors, motion sensors, window sensors, door sensors, sprinkler systems, etc.

In some embodiments, television receiver 340 may be able to transmit information to wireless transceiver 330. For example, in certain situations, television receiver 340 may initialize audio calibrator 110 and/or may activate condenser microphone 130 to receive a command from a user. Additionally, information to be stored by remote control 301 may be transferred by television receiver 340 to remote control 301. As an example, remote control 301 may be used to store various settings associated with various users. In some embodiments, via television receiver 340, individual users may be able to define particular orientations of remote control 301 to be associated with them personally. This information may be passed to remote control 301 such that, when a particular orientation is sensed using orientation sensor 320, audio calibrator 110 associates distance measurements made while in such orientation with a particular user's profile. Within this particular user's profile, audio settings may be compiled based on measured distances by RTT engine 112 that are effective in calibrating received audio for proper interpretation of received audio by audio interpreter 150.

Figure 4:
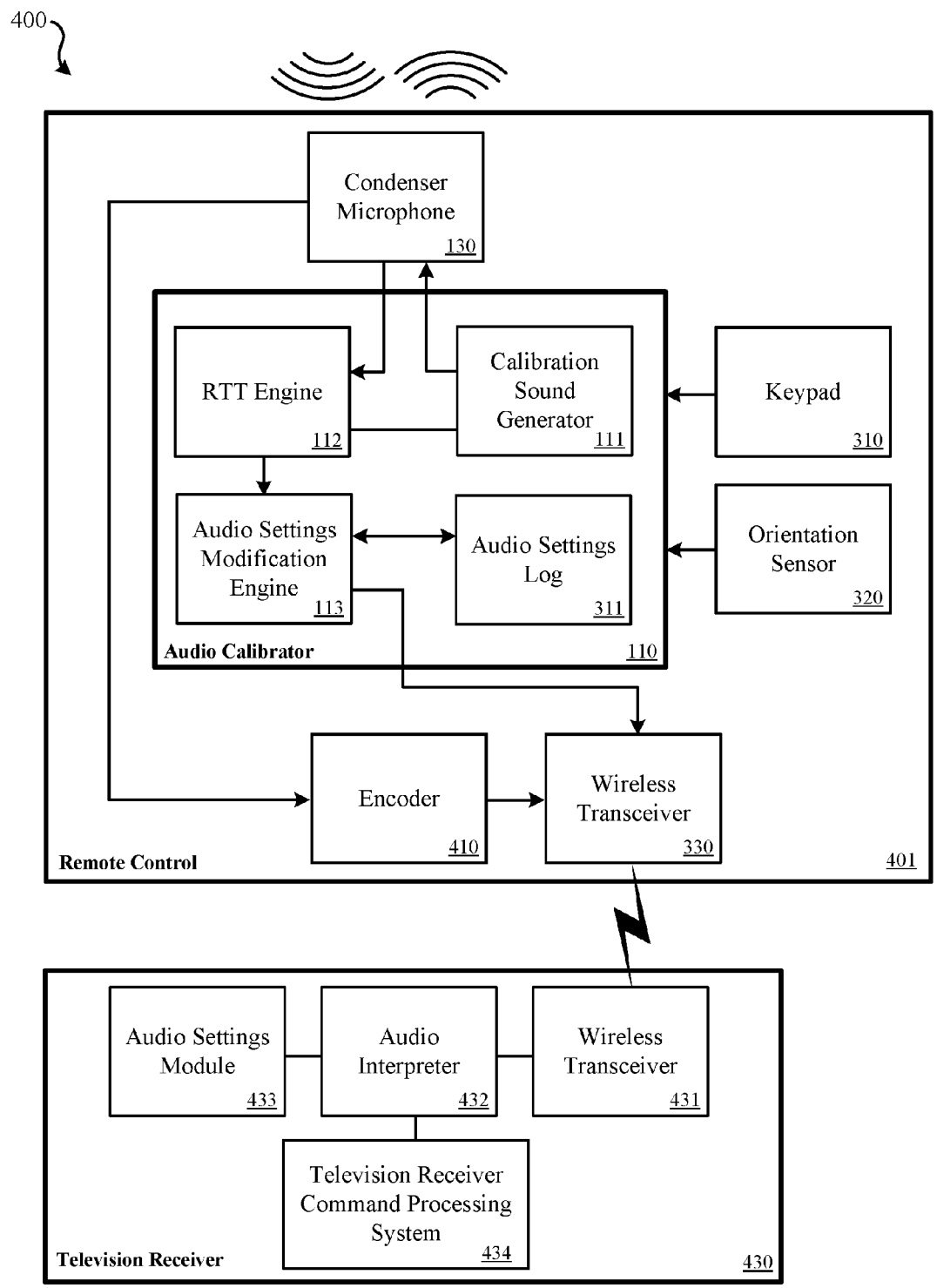
FIG. 4 illustrates an embodiment of a block diagram of a system that performs audio calibration using acoustic measurements for controlling a television receiver.

FIG. 4 illustrates an embodiment of a block diagram of a system 400 that performs audio calibration using acoustic measurements for controlling a television receiver. In system 400, rather than all of the processing related to audio calibrator 110 and audio interpretation being performed at the remote control, some of the functions are instead executed by the television receiver. In system 400, audio calibrator 110 may still be located on remote control 401. Audio settings determined based on such distance may be passed via wireless transceiver 330 to wireless transceiver 431 of television receiver 430. In some embodiments, rather than audio settings determined by audio settings modification engine 113 being transmitted to television receiver 430, a distance measurement may be transmitted to television receiver 430 and audio settings modification engine 113 may be located at television receiver 430.

Whether distance or audio settings are transmitted to television receiver 430 from a remote control 401, the audio settings may be stored using audio settings module 433. Once a spoken command is received by condenser microphone 130, encoder 410 may encode the spoken commands into a format appropriate to be transmitted via wireless transceiver 330. The encoded spoken command may then be transmitted to wireless transceiver 431 from wireless transceiver 330. Audio interpreter 432 may function substantially similarly to audio interpreter 150. Audio interpreter 432 may use the audio settings stored by audio settings module 433 in calibrating the encoded received spoken commands that are to be interpreted. Once interpreted, the commands may be transmitted to television receiver command processing system 434 for execution.

One possible advantage of having components such as audio interpreter 432 located at television receiver 430 may be to conserve power at remote control 401. For example, audio interpreter 432 may consume a significant amount of power. Having audio interpreter 432 located at television receiver 430 may allow more processing power to be devoted to audio interpreter 432 because a grid-based power source is likely connected with television receiver 430, while remote control 401 relies on one or more batteries for power.

Alternatively, one or more components may be executed by a remote cloud server rather than being executed by either remote control 401 or television receiver 430. For example, audio settings modification engine 113 and/or audio interpreter 432 may be executed by a network accessible cloud computing system. In such embodiments, encoded audio and/or distance measurements may be passed by wireless transceiver 330 wireless transceiver 431 of television receiver 430. Television receiver command processing system 434 may then pass the encoded audio and/or distance measurements to the cloud-based server via a network connection. In response, television receiver 430 may receive a command that was interpreted by the cloud-based server based on the received encoded audio and distance measurement (or audio settings, if determined by remote control 401 or television receiver 430).

Figure 5:
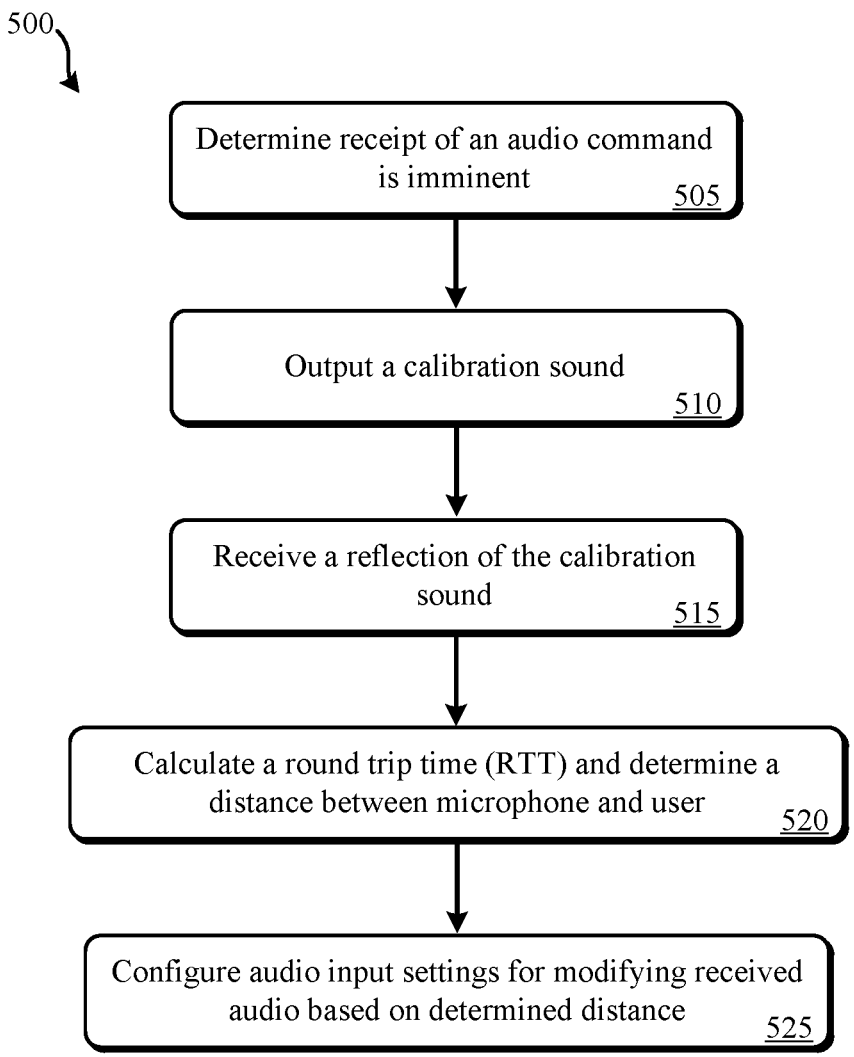
FIG. 5 illustrates an embodiment of a method for audio calibration based on acoustic measurements.

Various methods may be performed using the systems detailed in relation to FIGS. 1-4. Such systems may be incorporated as part of remote controls that are used to control television receivers, home automation systems, or other systems. Further, such systems may be incorporated as parts of devices other than remote controls. For instance, such systems may be incorporated as part of innumerable systems that receive spoken commands from users. FIG. 5 illustrates an embodiment of a method for audio calibration based on acoustic measurements. Method 500 may be performed using systems 100 through 400 of FIGS. 1-4 respectively.

At block 505, it may be determined that receipt of an audio command spoken by user is imminent. This determination may be based on the user having depressed a button or actuated some other component that corresponds to an indication of user audio input. In some embodiments, a user may perform a gesture on a touchpad and/or may hold the device in which the system is installed in a particular orientation to indicate user audio input.

At block 510, a calibration sound may be output. This calibration sound may be output by a speaker, buzzer, or by a condenser microphone. By applying electrical signal to the circuit of a condenser microphone, it may be possible to reverse the normal operation of the condenser microphone and cause the microphone to output a sound into the ambient environment of the condenser microphone. In some embodiments, the calibration sound output is formed by an electrical signal defined by equation 1 being transmitted to the condenser microphone of the system. At block 515, a reflection of the calibration sound may be received by the microphone. The reflection may be expected to have bounced off of a user's face if the user is holding the device that contains the system in an appropriate location at which the user will be providing a voice command to the condenser microphone.

At block 520, a round-trip time may be calculated based on the difference in time between when the calibration sound was output and when the reflection of the calibration sound was received at block 515. The round-trip time calculated at block 520 may then be used to determine the distance between the microphone and the object which caused the sound to be reflected. This object is likely a user's face if the system is positioned to receive a voice command user. Equation 2 may be used to calculate the distance between the microphone and the user's face.

At block 525, based upon the distance calculated at block 520, audio input settings may be configured that will be used to calibrate an audio command spoken by the user. The audio input settings configured at block 525 may include gain and/or equalization. The specific adjustments to gain and/or equalization based on distance may be determined by looking up the determined distance in a lookup table and using associated gain and/or equalization settings as indicated in the table. In other embodiments, an equation may be used to determine adjustments to gain and/or equalization based on calculated distance. For example, specific sound frequencies at which attenuation and/or constructive interference may occur may be calculated based on the distance. Equalization may be adjusted to account for this attenuation and/or constructive interference.

Figure 6:
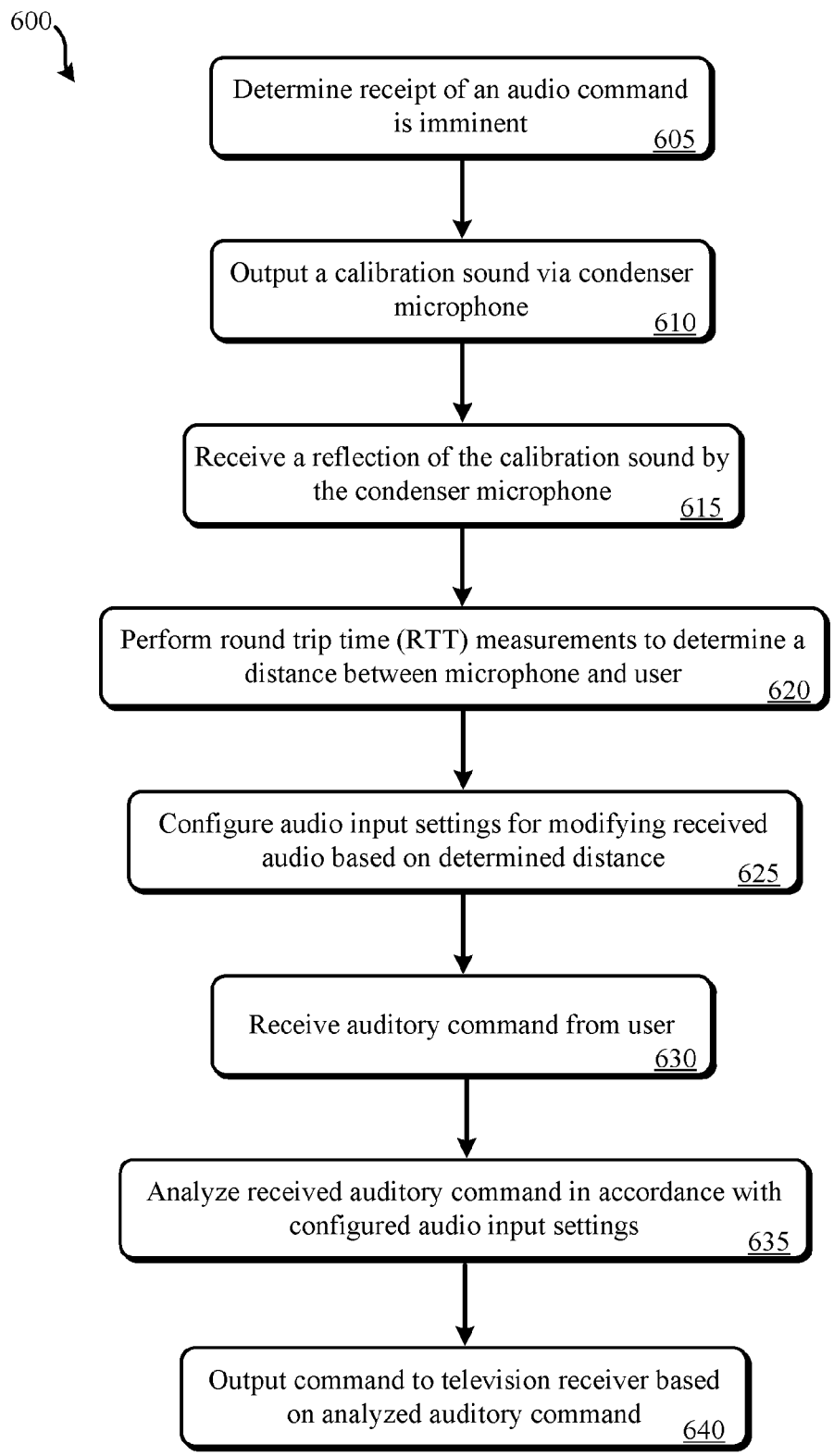
FIG. 6 illustrates an embodiment of a method for analyzing an auditory command received by a remote control of a television receiver.

FIG. 6 illustrates an embodiment of a method for analyzing an auditory command received by a remote control of a television receiver. In some embodiments, rather than the remote control being associated with a television receiver, a home automation host system is used. In such embodiments, the remote control may communicate with the home automation host system instead of (or in addition to) the television receiver. Method 600 may be performed using systems 100 through 400 of FIGS. 1-4 respectively. Specifically, method 600 may be performed using the remote control-based systems of FIGS. 3 and 4. Method 600 may represent a more detailed embodiment of method 500. As such, any of the blocks performed in relation to method 500 may also be performed as part of method 600.

At block 605, it may be determined that receipt of an audio command being spoken by user into the remote control is imminent. This determination may be based on the user having depressed a button or actuated some other component on the remote control or selected a menu item presented on a display device, such as a television, by a television receiver. In some embodiments, a user may perform a gesture on a touchpad of the remote control and/or holds the remote device in a particular orientation to indicate that the user is about to provide a voice command. The remote control may sense the gesture and/or orientation and activate one or more microphones of the remote control.

At block 610, a calibration sound may be output via a condenser microphone of the remote control. By applying an electrical signal to the circuit of a condenser microphone, it may be possible to reverse the normal operation of the condenser microphone and cause the microphone to output a sound into the ambient environment of the condenser microphone. In some embodiments, the calibration sound output is formed by an electrical signal defined by equation 1 being transmitted to the condenser microphone of the system. In embodiments where the remote control contains multiple microphones, calibration sounds may be output by each microphone. Each microphone may output the calibration sound and listen for an echo reflection in series. Based on whichever object is determined to be closest or within a defined distance range, it may be assumed the user is facing that particular microphone of the remote control.

At block 615, a reflection of the calibration sound may be received by the microphone of the remote control. The same microphone that emitted the sound then receives the reflected sound. The reflection may be expected to have bounced off of a user's face if the user is holding the device that contains the system in an appropriate location at which the user will be providing a voice command.

At block 620, a round-trip time may be calculated by a processor of the remote control based on the difference in time between when the calibration sound was output when the reflection of the calibration sound was received at block 615. The round-trip time calculated at block 620 may then be used to determine the distance between the microphone and the object which causes the sound to be reflected. This object is likely a user's face if the system is positioned to receive a voice command from the user. Equation 2 may be used to calculate the distance between the microphone and the user's face. In some embodiments, the velocity used for the speed of sound may be adjusted based on measured or received (e.g., via the television receiver) atmospheric conditions (e.g., humidity, temperature, altitude).

At block 625, based upon the distance calculated at block 620, audio input settings may be configured that will be used to calibrate an audio command spoken by the user. The audio input settings configured at block 625 may include gain and/or equalization. The specific adjustments to gain and/or equalization based on distance may be determined by using the determined distance to perform a look-up in a lookup table and using associated gain and/or equalization settings as indicated in the table. In other embodiments, an equation may be used to determine adjustments to gain and/or equalization based on calculated distance. For example, specific sound frequencies at which attenuation and/or constructive interference may be calculated based on the distance. Equalization may be adjusted to account for this attenuation and/or constructive interference. In some embodiments alternate and/or additional audio settings are set or adjusted based on the determined distance. In some embodiments, if the RTT measurement of block 620 failed or the distance measurement exceeded a threshold maximum distance, default settings may be used for the audio settings or the previously-set audio settings may be used. In some embodiments, based on the orientation of the remote control being held, it may be determined which user is using the remote control and audio settings previously associated with the user in a stored user profile may be used.

At block 630, a spoken command may be received from the user. This spoken command may be received shortly after block 605. For example, if block 605 was based on a user depressing a button the remote control, the spoken command may be expected to occur within 0.5 seconds of the button being depressed. The button may still be held depressed by the user at block 630. The user may release the button when he has finished speaking the command.

In some embodiments, blocks 610-625 may be performed after the spoken command has been received. For instance, in response to the user releasing the button, the distance measurement and adjustment of audio settings may be performed. This may be alternatively or in addition to performing the blocks prior to receiving the spoken command. If the blocks are performed both before and after the spoken command, the resulting distance measurements may be averaged to obtain audio settings to be used based on the look-up table and/or equations.

At block 635, the received auditory command is calibrated ahead of a speech recognition analysis. The calibration includes adjusting the received audio of the spoken command in accordance with the audio settings configured at block 625. For instance, the gain and equalization of the spoken command are adjusted ahead of the speech recognition analysis. The speech recognition analysis is then performed as part of block 635.

At block 640, an identified command spoken by the user is identified and output to a television receiver in communication with the remote control. The television receiver may then execute the command. In some embodiments, rather than a command being spoken by the user, the audio may include information. For instance, if a user is completing a data field on an on-screen form, the user may speak his email address. This spoken data may be interpreted and provided to the television receiver in a similar manner to a command. In some embodiments, feedback may be provided to the user. For instance, the television receiver may cause a television to present feedback based on the analysis of the spoken command and/or the calculated distance such as "speak louder," "speak slower," and "hold microphone farther away."

Figure 7:
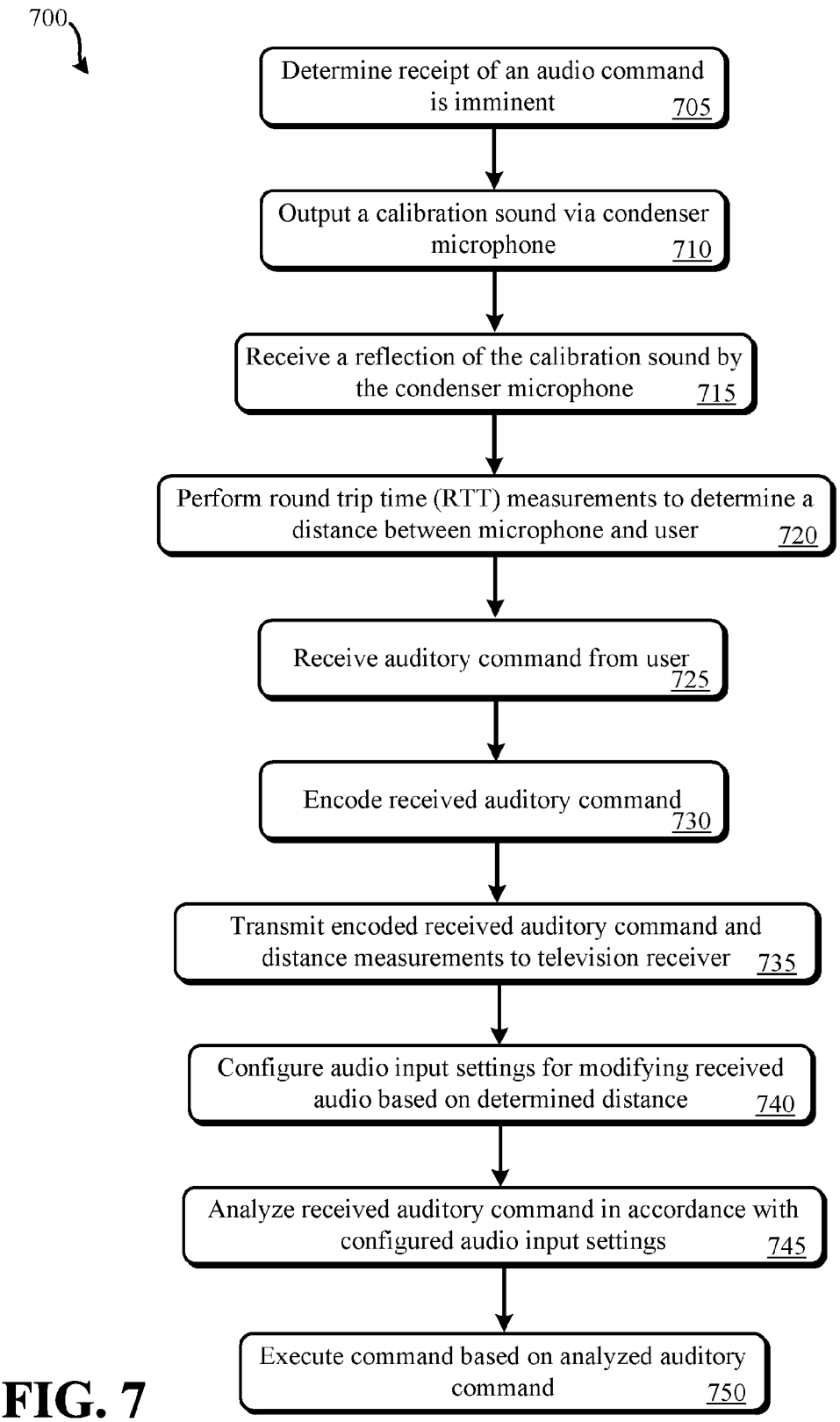
FIG. 7 illustrates another embodiment of a method for audio calibration based on acoustic measurements.

FIG. 7 illustrates an embodiment of a method 700 for audio calibration based on acoustic measurements. Method 700 may be performed using a remote control in combination with a television receiver. In some embodiments, rather than the remote control being associated with a television receiver, a home automation host system is used. In such embodiments, the remote control may communicate with the home automation host system instead of (or in addition to) the television receiver. Method 700 may be performed using systems 100 through 400 of FIGS. 1-4 respectively. Specifically, method 700 may be performed using the remote control-based systems of FIG. 4. Blocks 705, 710, 715, and 720 may be performed similarly to blocks 605, 610, 615, and 620, respectively, as detailed in relation to method 600. Each of these blocks may be performed locally at the remote control.

At block 725, an auditory command (or auditory data) may be received by the remote control from the user. Rather than being analyzed based on adjusted settings at the remote control, the remote control may encode the received auditory command for transmission to the television device at block 730. At block 735, the encoded auditory command may be transmitted to the television receiver. In some embodiments, the determined distance is also transmitted by the remote control to the television receiver. In other embodiments, rather than the determined distance being transmitted, the audio settings are determined at the remote control and transmitted to the television receiver.

If the distance measurement is transmitted to the television receiver, at block 740 audio input settings may be determined based on the received distance measurement by the television receiver. The audio input settings configured at block 740 by the television receiver may include gain and/or equalization. The specific adjustments to gain and/or equalization based on distance may be determined by using the determined distance to perform a look-up in a lookup table and using associated gain and/or equalization settings as indicated in the table. In some embodiments, the television receiver may access a table from a remote server from a remote cloud-based server. In other embodiments, an equation may be used to determine adjustments to gain and/or equalization based on calculated distance. For example, specific sound frequencies at which attenuation and/or constructive interference may occur may be calculated based on the distance. Equalization may be adjusted to account for this attenuation and/or constructive interference. In some embodiments alternate and/or additional audio settings are set or adjusted based on the determined distance. In some embodiments, if the RTT measurement of block 720 failed or the distance measurement exceeded a threshold maximum distance, default settings may be used for the audio settings or the previously-set audio settings may be used. In some embodiments, based on the orientation of the remote control being held, it may be determined which user is using the remote control and audio settings previously associated with the user in a stored user profile may be used.

At block 745, the received auditory command is calibrated ahead of a speech recognition analysis by the television receiver. The calibration includes adjusting the received audio of the spoken command in accordance with the audio settings configured at block 740. For instance, the gain and equalization of the spoken command is adjusted ahead of the speech recognition analysis. The speech recognition analysis is then performed by the television as part of block 745.

In some embodiments, rather than analysis of the encoded spoken command (or spoken data) being performed by the television receiver, the encoded spoken command (or data), the distance measurement and/or the configured audio input settings may be transmitted by the television receiver to the remote cloud-based server. In such embodiments, the television receiver is connected to the Internet and can thus communicate with the remote server. The remote cloud-base server may then perform the configuration of block 740 and/or analysis of block 745. The television receiver, in response to transmitting such data to the remote server, receives a response message indicative of a command or data. At block 750, the command or data spoken by the user is executed or otherwise input to the television receiver.

Figure 8:
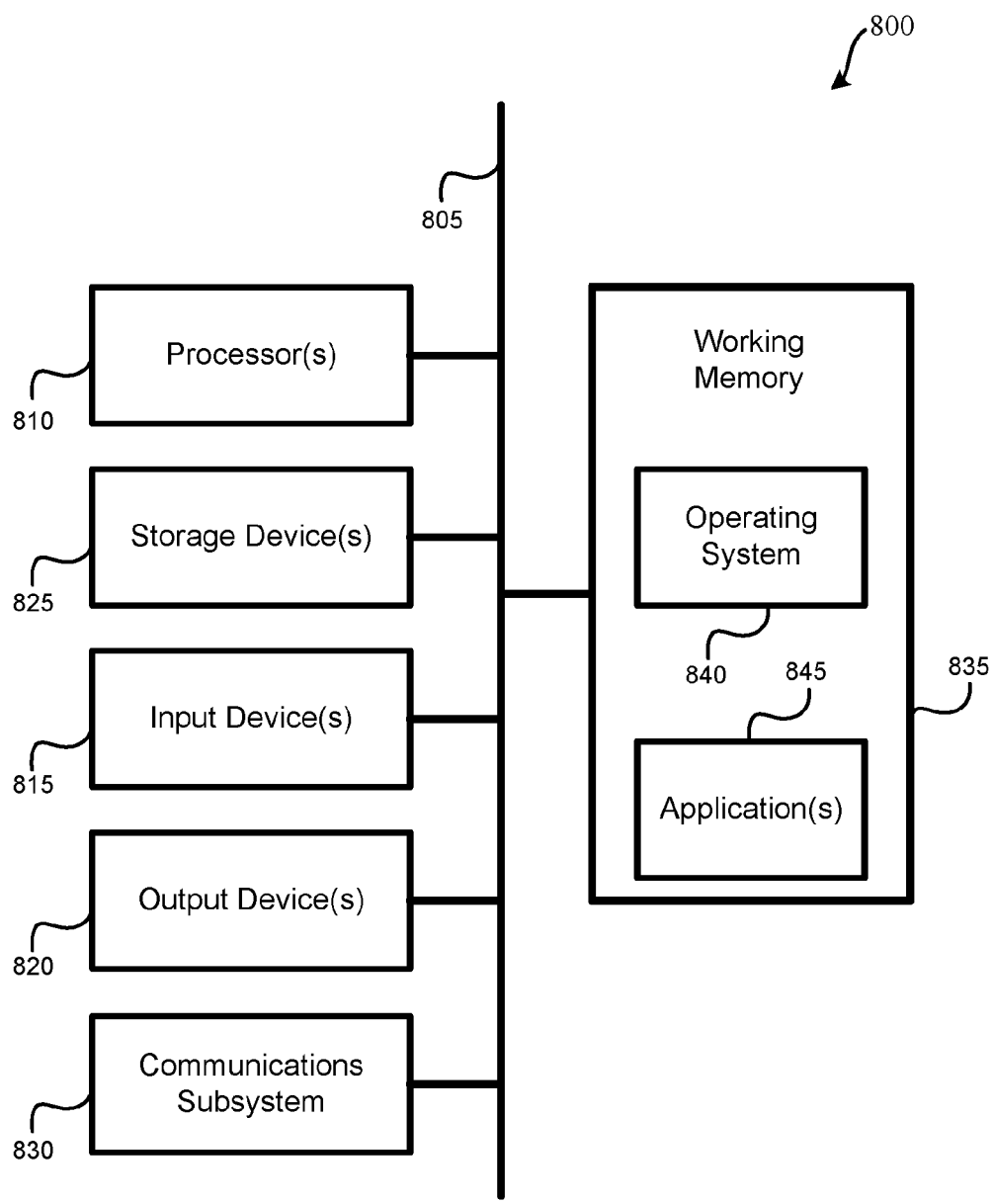
FIG. 8 illustrates an embodiment of a computer system that may be incorporated as part of a remote control and/or television receiver.

A computer system as illustrated in FIG. 8 may be incorporated as part of the previously described computerized devices, such as the remote controls, television receivers, home automation systems, and remote cloud-based servers. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a touchscreen, keyboard, remote control, and/or the like; and one or more output devices 820, which can include without limitation a display device, a printer, etc.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor(s) 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional blocks not included in the figure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of blocks may be undertaken before, during, or after the above elements are considered.

What is claimed is:

1. A method for audio calibration of a television receiver remote control, the method comprising:

determining, by a television receiver remote control, an orientation of the television receiver remote control based on data from an on-board orientation sensor;

determining, by the television receiver remote control, that the determined orientation of the television receiver remote control corresponds to a defined orientation for receiving an audio-based command from a user;

in response to determining that the determined orientation of the television receiver remote control corresponds to the defined orientation, outputting, via a microphone incorporated as part of the television receiver remote control, a calibration sound;

receiving, via the microphone incorporated as part of the television receiver remote control that output the calibration sound, a reflected sound that is an acoustic reflection of the calibration sound;

analyzing an amount of time that has elapsed between outputting the calibration sound and receiving the reflected sound to determine a distance between the microphone and the user; and configuring one or more audio input settings, comprising equalization settings, that are used for modifying audio received by the microphone based on the determined distance, wherein the equalization settings are configured to attenuate an amplitude of a frequency having a half wavelength equal to the determined distance.

2. The method for audio calibration of claim 1, further comprising:

receiving, by the television receiver remote control, audio from the user via the microphone;

analyzing, by a processor of the television receiver remote control, the audio in accordance with the configured one or more audio input settings to determine a command; and transmitting, via a wireless transmitter of the television receiver remote control, the command to a television receiver.

3. The method for audio calibration of claim 1, further comprising:
    receiving, by the television receiver remote control, audio from the user via the microphone;
    transmitting, via a wireless transmitter of the television receiver remote control, a recording of the audio to a television receiver; and
    analyzing, by a processor of the television receiver, the audio in accordance with the configured one or more audio input settings to determine a command.

4. The method for audio calibration of claim 1, wherein configuring the one or more audio input settings comprises configuring gain.

5. The method for audio calibration of claim 1, wherein determining that the television receiver remote control is in the orientation for the audio-based command to be received by the television receiver remote control from the user is based in part on a button of the television receiver remote control being pressed.

6. The method for audio calibration of claim 1, further comprising:
    updating a log that stores data based on a plurality of distance measurements made by analyzing amounts of time that have elapsed between outputting calibration sounds and receiving reflected sounds, wherein:
        configuring the one or more audio input settings that are used for modifying audio received by the microphone is further based on analysis of the log.

7. The method for audio calibration of claim 1, wherein the microphone is selected from the group consisting of: a condenser microphone and a dynamic microphone.

8. A television receiver remote control that performs audio calibration, the television receiver remote control comprising:
    a wireless transmitter for transmitting to a television receiver;
    an accelerometer;
    a condenser microphone; and
    a processor configured to:
        determine an orientation of the television receiver remote control based on data from the accelerometer;
        determine that the determined orientation of the television receiver remote control corresponds to a defined orientation for receiving an audio-based command from a user;
        output, via the condenser microphone a calibration sound in response to determining that the determined orientation of the television receiver remote control corresponds to the defined orientation;
        receive, via the condenser microphone, a reflected sound that is an acoustic reflection of the calibration sound;
        analyze an amount of time that has elapsed between outputting the calibration sound and receiving the reflected sound to determine a distance between the condenser microphone and the user; and
        configure one or more audio input settings, comprising equalization settings, that are used for modifying audio received by the condenser microphone based on the determined distance, wherein the equalization settings are configured to attenuate an amplitude of a frequency having a half wavelength equal to the determined distance.

9. The television receiver remote control that performs audio calibration of claim 8, wherein the processor is further configured to:
    receive audio from the user via the condenser microphone;
    analyze the audio in accordance with the configured one or more audio input settings to determine a command; and
    transmit, via the wireless transmitter of the television receiver remote control, the command to the television receiver.

10. The television receiver remote control that performs audio calibration of claim 8, wherein the command requests a channel change at the television receiver.

11. The television receiver remote control that performs audio calibration of claim 8, wherein the processor is further configured to:
    receive audio from the user via the condenser microphone;
    transmit, via the wireless transmitter of the television receiver remote control, a recording of the audio to a television receiver; and
    analyze the audio in accordance with the configured one or more audio input settings to determine a command.

12. The television receiver remote control that performs audio calibration of claim 8, wherein the processor configuring the one or more audio input settings comprises the processor configuring gain.

13. The television receiver remote control that performs audio calibration of claim 8, wherein the processor configuring the one or more audio input settings comprises the processor configuring equalization.

14. The television receiver remote control that performs audio calibration of claim 8, wherein the processor determining that the television receiver remote control is in the orientation for the audio-based command to be received by the television receiver remote control from the user is based in part on a button of the television receiver remote control being pressed.

15. The television receiver remote control that performs audio calibration of claim 8, wherein the processor is further configured to:
    update a log that stores data based on a plurality of distance measurements made by analyzing amounts of time that have elapsed between outputting calibration sounds and receiving reflected sounds, wherein:
        the processor configuring the one or more audio input settings that are used for modifying audio received by the condenser microphone is further based on the processor analyzing the log.

16. A non-transitory processor-readable medium comprising processor-readable instructions configured to cause one or more processors of a television receiver remote control to:
    determine an orientation of the television receiver remote control based on data from an orientation sensor of the television receiver remote control;
    determine that the determined orientation of the television receiver remote control corresponds to a defined orientation for receiving an audio-based command from a user;
    output, via a microphone incorporated as part of the television receiver remote control, a calibration sound in response to determining that the determined orientation of the television receiver remote control corresponds to the defined orientation;
    receive, via the microphone, a reflected sound that is an acoustic reflection of the calibration sound;
    analyze an amount of time that has elapsed between outputting the calibration sound and receiving the reflected sound to determine a distance between the microphone and the user; and configure one or more audio input settings, comprising equalization settings, that are used for modifying audio received by a condenser microphone of the television receiver remote control based on the determined distance, wherein the equalization settings are configured to attenuate an amplitude of a frequency having a half wavelength equal to the determined distance.

* * * * *